(No Model.)

T. A. BREWER.
HORSE POWER.

No. 255,583. Patented Mar. 28, 1882.

WITNESSES:
C. Neveux
C. Sedgwick

INVENTOR:
T. A. Brewer
BY Munn & Co.
ATTORNEYS.

UNITED STATES PATENT OFFICE.

THOMAS A. BREWER, OF OLIVER, GEORGIA.

HORSE-POWER.

SPECIFICATION forming part of Letters Patent No. 255,583, dated March 28, 1882.

Application filed September 24, 1881. (No model.)

*To all whom it may concern:*

Be it known that I, THOMAS A. BREWER, of Oliver, in the county of Screven and State of Georgia, have invented a new and Improved Horse-Power, of which the following is a specification.

The object of my invention is the production of an improved horse-power for cotton-ginning, thrashing, and similar machines, which power shall be simple, durable, cheap of construction, and of less friction than machines for this purpose now in use.

My invention consists of a horizontal shaft carrying a large and small pulley, of three belt-guides—one horizontal and two vertical—and of a swing belt-tightener, in combination with the main power-wheel and suitable belts leading from the main power-wheel between the belt-guides to the small pulley on the shaft and from the large pulley on the shaft to a pulley on the cylinder or shaft of the machine to be operated.

Reference is to be had to the accompanying drawings, forming part of this specification, in which similar letters of reference indicate corresponding parts in all the figures.

Figure 1:
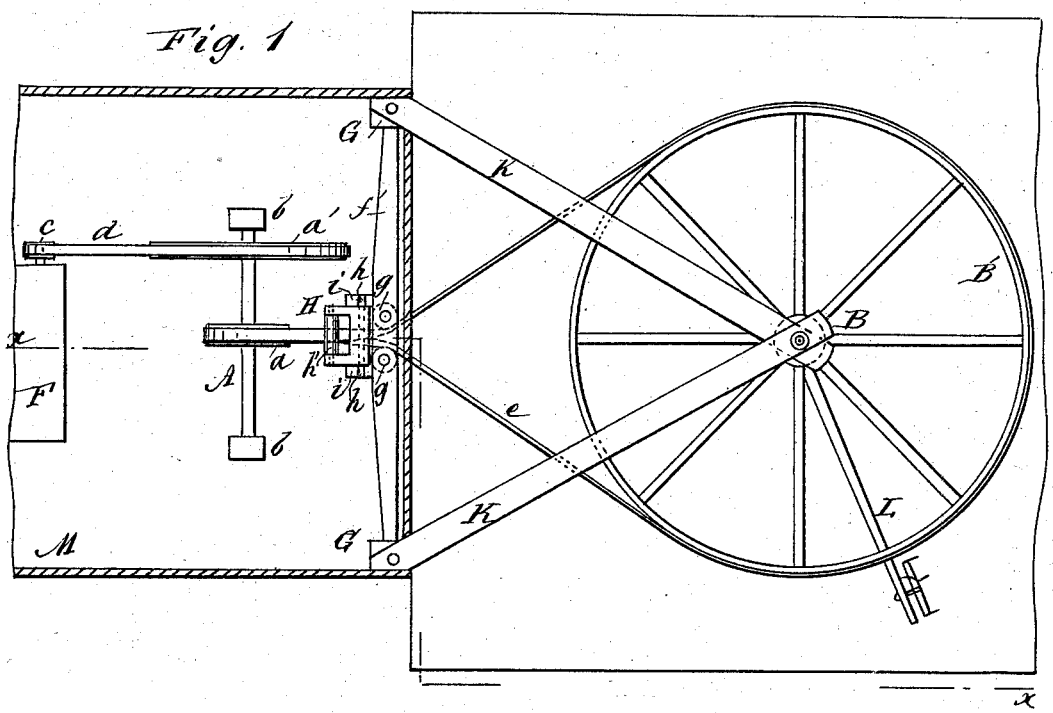
Figure 2:
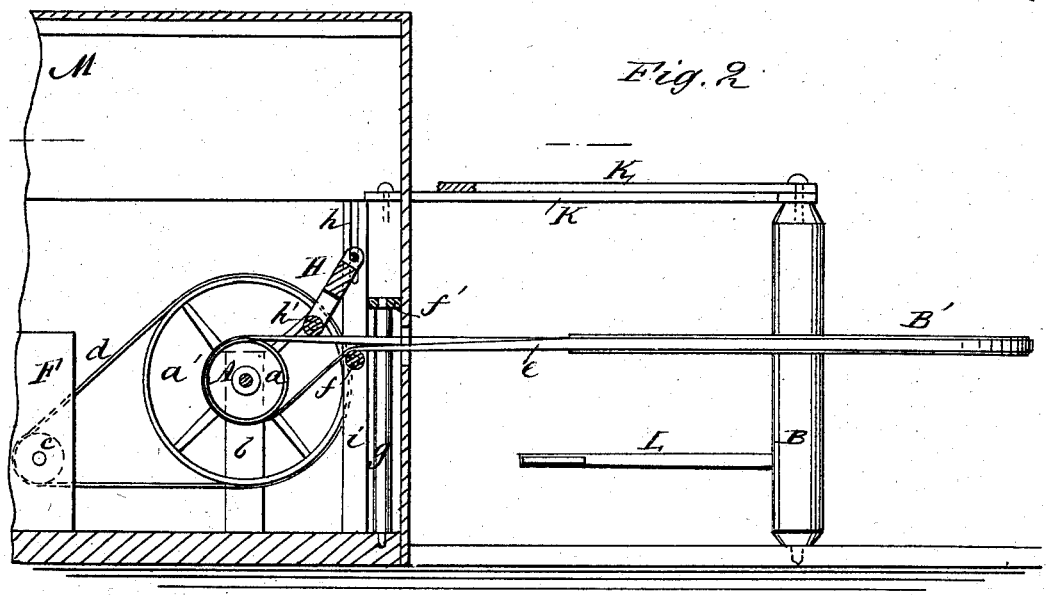

Figure 1 is a plan view of my invention; and Fig. 2 is a sectional elevation of the same, taken on the line $x$ $x$ of Fig. 1.

In the drawings, A represents the horizontal shaft, which is journaled in the posts $b$ $b$, inside of the mill or inclosure M; and B represents the vertical king-post, to which the main power-wheel B' is secured, and which is revolved by horses attached to the main lever L, secured in the post B below the power-wheel, as shown.

Upon the shaft A is fixed the small pulley $a$ and the larger pulley $a'$, and the shaft receives motion from the belt $e$, leading from the main wheel B' over the small pulley, and communicates it to the ginning, thrashing, or other machine F by means of the belt $d$ passing over the larger pulley $a'$ and the small pulley $c$ on the machine F.

The belt $e$ is guided from the main power-wheel to and over the small pulley $a$ on the shaft A by the horizontal roller $f$ and the vertical rollers $g$ $g$, over and between which it passes, and the belt is kept tightened by the swinging tightener H, which moves in the vertical slots $h$ $h$, and which is provided, where it comes in contact with the belt, with the roller $h'$, as shown clearly in Fig. 2.

The lower end of the king-post B may be journaled and supported in any suitable support or frame or foundation set in the ground, and the upper end of it may be journaled in and braced and supported by the outer ends of the crossed boards K K, which boards are securely attached in any suitable manner at the rear ends to the building M, as shown in the drawings; but they are preferably nailed upon the short posts G G at the corner of the building.

The upper ends of the rollers $g$ $g$ for guiding the belts $e$ are preferably journaled in the horizontal cross-bar $f'$, which bar is secured at its ends in the said short posts G G, and the slots $h$ $h$, in which the swinging tightener H moves, are preferably formed in the upright posts $i$ $i$, fixed in proper position in the floor of the building, as shown. By this construction the friction of the parts is reduced to a minimum, and the parts are durable, and the whole machine is very cheap of construction and economical in its use as a transmitter of power.

Having thus fully described my invention, I claim as new and desire to secure by Letters Patent—

1. The shaft A, carrying the small pulley $a$ and the larger pulley $a'$, in combination with the main power-wheel B', the vertical belt-guides $g$ $g$, the horizontal guide or roller $f$, the swinging tightener H, and the belts $e$ and $d$, substantially as and for the purposes set forth.

2. The horizontal roller $f$ and the vertical guide-rollers $g$ $g$, in combination with the belt-tightener H, pulley $a$, power-wheel B', and the belt $e$, substantially as and for the purposes set forth.

THOMAS A. BREWER.

Witnesses:
A. H. BREWER,
H. P. BREWER.